Patented Mar. 15, 1949

2,464,302

UNITED STATES PATENT OFFICE 2,464,302

MANUFACTURE OF CHROME ALLOY STEEL

Charles E. Funk, Latrobe, Pa.

No Drawing. Application May 15, 1945,
Serial No. 593,975

5 Claims. (Cl. 75—130.5)

This invention relates to the manufacture of chrome alloy steel from materials including chrome ore, and more particularly to such manufacture in an open hearth furnace of the regenerative type.

The principal object of the invention is the employment of chrome ore as at least the main source of supply of chrome in the manufacture of chrome alloy steel.

Other and further objects of this invention will appear from the following description and the appended claims.

In the manufacture of chrome alloy steel, according to former practice, it has been customary to introduce the metallic chrome into the molten steel mass in the form of metallic chrome, iron-chrome alloy (FeCr) and chrome in combination with an exothermic compound. These chrome bearing materials had to be manufactured from chrome ore by well-known practices in which form they are relatively expensive. Consequently the manufacture of chrome alloy steel has been an expensive process.

It is the purpose of the present invention to obtain at least the major portion of the chrome needed to make chrome alloy steel by reducing chrome directly from relatively inexpensive chrome ore of any commercial analysis during the steel making process. That is to say, the chrome ore is melted and reduced in the same furnace and at the same time that the steel is manufactured. Thus chrome ore is one of the substances used in the steel manufacture, eliminating the necessity of using any metallic chrome in such manufacture except for small adjustment in cases of very close specifications.

The present invention contemplates using chrome ore as a substance in steel manufacture in open hearth furnaces. either acid or basic, of the regenerative type. The chrome ore may be used as the sole source of metallic chrome, or it may be used together with a source of chrome obtained by the use of chrome scrap in the furnace charge.

The following description will first set forth a method of manufacturing chrome alloy steel in a basic open hearth furnace, employing chome ore and scrap, or chrome ore and scrap and pig iron. The scrap used may be carbon steel scrap and/or chrome steel scrap. The method is the same except that where the charge includes chrome steel scrap, then of course some of the chrome oxide reduced will have come from the chrome scrap. However, for simplicity, where "chrome" or "chrome oxide" occurs in the following example of a method according to the present invention, it will be understood that all the "chrome" or "chrome oxide" is being included regardless of its source.

In using very large quantities of scrap (with chrome ore), and in recovering a large percentage of the chrome present, three problems are presented, namely (1) melting the scrap and chrome ore, (2) obtaining a workable slag so that the metal can be properly refined, and (3) recovering the maximum amount of metallic chrome from the charge.

The first problem involves melting the scrap and chrome ore. This can be accomplished by proper charge of the scrap and chrome ore, paying particular attention to position and size of the chrome ore in the charge and to size of scrap and the time interval between finish of scrap charge and the later charging of pig iron where pig iron is used. The pig iron charge should not be made until the scrap is more completely melted than would be by conventional practice, which is possible since the presence of chrome oxide prevents high foaming of the slag. In the case of an all scrap with chrome ore charge, replacing the pig iron by graphite or some such carbon source, a time interval should be allowed between the first scrap charge and the last scrap charge, the exact time being determined by the furnace operator. Very great care should be exercised in selecting the scrap, paying particular attention to the content of light to heavy melt scrap present.

The second problem, that of obtaining a workable slag, can be solved by properly charging so that the silicon in the charge is lower than usual, or by providing the correct quantity of lime so that melt-in slag will be low in iron oxide and have a lime-silica ratio of not less than 1 with only very small quantities of undissolved lime present, and thereafter making additions to the slag as will later appear.

The third problem, that of recovering a high percentage of metallic chrome, involves a very rigid slag control. It is essential that the slag be held at 1.2 to 1.9 lime-silica ratio during the working period and then by proper additions of lime (burnt lime), silicon, carbon (coke, coal, graphite, etc.) and fluorspar, the ratio be rapidly increased and the iron oxide kept low or even reduced. The additions must be properly made and at the correct time or the proper reactions will not occur.

In solving the three problems much will depend upon attaining the most efficient temperatures of the metal and slag. High temperatures are inducive to high chromium recovery.

At the outset it may be stated that the quantity of chrome in the steel is a function of the chrome content of the charge, the lime and silica contents of the slag, the iron oxide content of the slag, the temperature of the metal and slag, and the quantity of the slag involved. This involves a controlled charge so as to obtain the desired lime, silica, and iron oxide in the slag as well as the correct slag volume at melt-in, and particularly a method of slag development by additions of lime, silicon, carbon and fluorspar singly or in mixtures so as to obtain certain and definite reactions which will result in the reduction of the chrome oxide from the slag to metallic chrome which gives over to the metal bath. Any combination of limestone or burnt lime can be charged but it is advisable to use a burnt lime charge (at least 60% burnt lime) in place of raw limestone since it is essential that the proper basicity at melt-down be obtained, and secondly, that the melt be worked under an extremely low slag volume. The amount of lime charged will also be governed to some extent by the amount of phosphorus in the charge and the maximum limits of phosphorus allowed for the particular metal specification being produced.

The relative percentages of the lime and silica, that is to say the value of the ratio $CaO/SiO_2$, symbolized by "V," is very important, as will later more fully appear. The working of the slag, according to the present invention, is also very important and should be carried out by efficient operators who must not only be efficient generally speaking but also efficient as to the practice to be followed in working the slag according to the present invention if the desired results are to be obtained.

Of course highly refined steel is of first importance, and the charging, working and refining periods are directed toward this end. But furthermore the working period of the present invention involves a practice directed toward obtaining the high percentage of chromium from the chrome-containing materials charged, which requires close adherence to the proper temperatures and the proper proportions of the materials regarding which the percentage of chrome recovery is a factor, as previously mentioned.

The slag must be carefully controlled (1) to obtain the proper volume of slag; (2) to limit the quantity of iron oxide; (3) to obtain the proper "V" values; and (4) the slag and metal must be carefully watched to obtain the proper temperatures. It is important that the slag volume does not become excessive, also that the quantity of iron oxide does not become excessive, and that the proper "V" values be obtained as conditions require.

The control of the factors will be large dependent upon the materials used in making up the charge as the quantities of the materials and the factors will vary according to the nature of the charge and are due largely to the chrome ore, type of scrap, pig iron if used, and burnt lime and/or limestone.

The chrome recovery is carried out largely toward the end of the heat when an increase in basicity and a decrease in ferrous oxide has been obtained by means of a slag deoxidizer. The slag in its early stages is more or less acid. Some of the melted iron is oxidized, appearing at least in one form as FeO, and when chrome scrap is employed some of the melted chrome of the scrap reacts with the iron oxide to form chrome oxide, appearing at least in one form as $CR_2O_3$, the reaction being indicated by the equation.

$$2Cr+3FeO=Cr_2O_3+3Fe$$

The chrome in the chrome ore occurs in the form of $Cr_2O_3$, and enters the slag because in this form it is insoluble in the molten metal.

This chrome oxide, where the slag is acid, has a strong affinity for the iron oxide present and reacts therewith, appearing in another form, called "spinels," which for the present purpose may be indicated by $FeO \cdot Cr_2O_3$, which are known as chromite spinels. These chromite spinels are insoluble in the slag while the chrome oxide is held in solid solution in the oxide phase of the slag.

The chromite spinels present a difficulty in the formation of a workable slag and in the recovery of metallic chrome therefrom as in spinel form the chrome oxide can not be reduced. The presence of spinels decreases the fluidity of the slag making it less workable. Therefore their formation should be prevented and those formed should be dissolved as rapidly as possible. The factor which governs or controls the form of the chrome oxide is the degree of basicity of the slag (with certain basicities the spinels, and with other basicities the chrome oxide in solid solution in the oxide phase of the slag). Therefore the slag, as soon as it is practicable, is tranformed to an intermediate basic slag, in which slag the spinels do not form. The transformation from acidity to basicity is performed by the addition of a sufficient amount of lime, burnt lime and/or limestone being used for this purpose, the object being to obtain a proper "V" value, this value being increased of added lime.

Furthermore the intermediate basic slag results in the dissolution of the spinels, thereby freeing the chrome oxide from the iron oxide. By the employment of this slag control procedure which involves strong deoxidizers the chrome oxide is transformed into metallic chrome which leaves the slag and passes to the metal. It is contemplated to add carbon in some form to serve as a deoxidizer and to prohibit further formation of iron oxide although the addition in some cases may not be necessary. When some of the carbon added unites with some of the lime present to form a calcium carbide, this compound reacts to reduce the iron oxide and possibly the chrome oxide, the reactions being indicated by the equations:

(1) $\quad CaC_2+3FeO=CaO+3Fe+2CO$
(2) $\quad CaC_2+Cr_2O_3=CaO+2CO+2Cr$

Reaction 1 probably precedes Reaction 2 and as a result some of the chrome oxide may be reduced by the free iron, the reaction being indicated by the equation:

$$Cr_2O_3+3Fe=2Cr+3FeO$$

When calcium carbide does not form it is presumed that the deoxidizing reaction is according to the following equations:

(1) $\quad Cr_2O_3+FeO+2Fe \xrightarrow{\text{excess } CaO} 2Cr+2CaO \cdot Fe_2O_3+FeO$ (2) $\quad Cr_2O_3+2Fe \xrightarrow[FeO]{\text{excess } CaO} 2Cr+2CaO \cdot Fe_2O_3$ (3) $\quad Cr_2O_3+3C \underline{\underline{CaO}} \; 2Cr+3CO.$ It has been stated that the presence of excessive iron oxide should be prevented. This will be accomplished by the lime and silicon and by the carbon which protects the iron against further oxidation. Furthermore addition of aluminum, silicon and/or calcium carbide to the slag may effect an iron oxide reduction according to the following equations:

(1) $2Al + 3FeO = Al_2O_3 + 3Fe$
(2) $Si + 2FeO = SiO_2 + 2Fe$
(3) $CaC_2 + 3FeO = CaO + 2CO + 3Fe$

The characteristics of the slags are studied by a pancake test which may be of any size, and/or by chemical analysis. The pancake test is probably the safest and surest way of observing for spinel structures as well as estimating the iron oxide and lime-silica ratios. It is desirable to melt-in with a lime-silica ratio or "V" value of 1.0 to 1.4, preferably 1.4 of the ice-fern type slag rather than the furrowed type slag. The icefern slag is lower in iron oxide and is usually more fluid. Additions of carbon, silicon, or aluminum to the furrowed slag will help lower the iron oxide and possibly change the slag to the ice-fern type.

As the steel-making operation progresses, lime should be added to increase the "V" value to 2.0 to 2.4, although chrome reduction will occur at lower "V" values. The iron oxide content of the slag should be under 7% at this time (the lower the better), but if above it may be reduced by moving, through the slag, rods to which a few pounds of aluminum have been tied, or preferably by further additions of silicon since aluminum is fairly expensive.

Before the main chrome reduction a reboil may be used to assure proper temperatures as well as for other metallurgical reasons. Approximately one hour before the reboil, the first lime-carbon, lime-silicon-carbon, lime-silicon, or lime additions are made to increase the "V" value and to provide a strong deoxidizer. Further additions of lime-carbon and silicon are also made if desired. Short block periods are very desirable also, and the absolute minimum of silicon in the block is advisable.

As has been stated, it is essential in carrying out the invention to provide a slag conducive to large chrome recovery and one that is easily workable. The slag must be kept very fluid at all times during the working period. This will permit satisfactory heat transfer to the metal, will prevent excessive iron oxide formation, and will leave the chrome oxide free for reduction.

The volume of the slag should be kept down within good working limits. If one desires, the pig iron of the charge may be replaced with graphite or some such suitable material. This will allow lower flux charges, thus resulting in lower slag volume. Ordinarily it is not desirable to add silicon or silicon-containing material to such a charge as the charge will generally contain sufficient of this material. To add silicon in the charge would only increase the volume of the slag, lending to its acidity and requiring thereby the addition of more lime or lime-containing material to counteract the acidity, such addition of lime furthermore increasing the volume of the slag. A slag volume of 8% of the charge should be considered maximum.

The invention is adaptable to various charges. The practice of working the slag will vary according to the charge employed and will further vary according to the particular condition of the basic open hearth regenerative furnace employed.

As an instance of a suitable charge may be mentioned one where pig iron and scrap, with chrome ore, are employed in the charge. Here preferably the pig iron should have a low silicon content, for example not more than 1%. Where pig iron is not easily available or where it is more economical to replace the pig iron, it may be replaced in whole or in part by a carbon addition such as coal, briquetted charcoal, coke or graphite, preferably graphite. Coal and coke are less desirable than graphite. The coal causes considerable ash which may cause checkers to clog, is bulky and burns or oxidizes very quickly. The coke is bulky, thus choking the furnace during charge, and oxidizes somewhat faster than graphite.

Typical charges for the pig iron practice and for the all scrap practice, both with chrome ore, are listed below:

*Pig iron charge—(.40 c steel)*

| | Per cent |
|---|---|
| Chrome ore | Amount depends upon chrome needed. |
| Raw lime | .80 |
| Burnt lime | [1] .80 |
| Pig iron (cold) | 36.0 |
| Light scrap | 20.0 |
| Medium heavy scrap | 44.0 |

[1] Total CaO 1.3%.

Order of charge:
1. 10% light scrap spread evenly over bottom.
2. Chrome ore spread over the light scrap.
3. Lime spread over the chrome ore.
4. Balance of scrap charge.
5. Melt down 1 to 1½ hours then charge pig iron.

*Graphite charge—(.40 c steel)*

| | Per cent |
|---|---|
| Chrome ore | Amount depends upon chrome needed. |
| Graphite | [2] 2.3 |
| Burnt lime | [2] 1.0 |
| Light scrap | 20.0 |
| Medium heavy scrap | 80.0 |

[2] Of the metallic charge.

Order of charge:
1. 10% of light scrap spread evenly over bottom.
2. Chrome ore spread over the light scrap.
3. Burnt lime spread over the chrome ore.
4. Graphite.
5. 60% of all scrap.
6. Balance of scrap 1 to 2 hours later.

In the aforedescribed methods of manufacturing chrome alloy steel in a basic open hearth furnace employing a charge including scrap as a source of iron or a charge including scrap and pig iron as a source of iron, the chrome ore used to supply all or some of the chrome may be put in the furnace with the charge before heating, put in as additions to the charge during melt-down, or put in as additions during the working period. That is to say, the chrome ore may be put in the furnace with the original charge of scrap before heating; it may be put in with scrap additions during melt-down, or with the pig iron during melt-down, or, where pig iron was substituted for by graphite, it may be put in with the graphite before heating. Furthermore, if desired, the chrome ore may be put in as additions to the slag during the furnace procedure, after some or all of the initial charge has been melted down.

As the graphite is put in the furnace before the melt-down period chrome ore charge with the graphite is similarly put in before the melt-down period. Otherwise, for best results, the chrome ore should be added with either the scrap and/or with the pig iron.

The highest recovery of chrome from the chrome ore has been obtained when the chrome ore was put in the furnace with the charge before the melt-down period. Recoveries of from 65 to 97.0% of the chrome in the chrome ore have been thus realized. As chrome ore is a relatively cheap substance, and as here high recovery has been obtained therefrom, use of the chrome ore has greatly reduced the cost of manufacturing the chrome alloy steel.

Chrome ore can be used as the sole source of chrome for the chrome alloy steel. In such a case the charge will receive its iron from an all carbon-scrap charge and a carbon material such as graphite or from a carbon scrap and pig iron charge with or without a carbon material such as graphite.

Where chrome scrap is used in the charge, then not so much chrome ore will be needed in order to obtain the desired chrome alloy steel in comparison with the chrome ore needed where only carbon scrap is used. Recovery of chrome from the chrome ore is similar whether or not chrome scrap is employed.

Chrome ore may also be used in an acid open hearth furnace as a source of supply of chrome in the manufacture of chrome alloy steel. The chrome ore can be added to the charge or later added to the slag and small lime additions can be made to the slag to increase the chrome recovery from the ore. No special control practice is necessary in the acid type furnace whereas, as aforesaid, the control practice in the basic open hearth furnace is of great importance. The percentage of recovery of chrome ore in the acid furnace is similar to the recovery in the basic furnace.

The invention claimed and desired to be secured by Letters Patent is:

1. A method of making chrome alloy steel in a basic open hearth furnace of the regenerative type which consists in charging the furnace with materials containing silicon, chrome, iron, lime and carbon, one of said materials being chrome ore; heating the charge, thereby to provide molten metal with a slag thereon, the slag containing chrome oxide, iron oxide, silica, and substantially all of the lime in a lime-silica ratio of not less than 1, and to render the slag suitable for working; working said slag during the refining of the molten metal, including adding lime thereto, thus increasing the lime-silica ratio and hence the basicity of said slag in order to increase the reducible chrome oxide in the slag and thereby provide a slag from which metal oxides can be reduced, thereafter adding at least one of the groups including carbon and silicon to the slag to reduce iron oxide and to prevent further iron oxidation; thereafter adding further silicon to the slag when the slag is at a chrome oxide reducing temperature with a lime-silica ratio of not less than 2.0, said silicon being in sufficient quantity to effect reduction of the chrome oxide in the slag, the chrome of the chrome oxide returning to the molten metal; and tapping the molten metal.

2. A method of making chrome alloy steel in a basic open hearth furnace of the regenerative type which consists in charging the furnace with materials containing silicon, chrome, iron, lime and carbon, one of said materials being chrome ore; heating the charge thereby to provide molten metal with a slag thereon, the slag containing chrome oxide, iron oxide, silica, and substantially all of the lime in a lime-silica ratio of not less than 1, and to render the slag suitable for working; working said slag during the refining of the molten metal, including adding lime thereto, thus increasing the lime-silica ratio to from 1.0–1.9 and hence the basicity of said slag in order to increase the reducible chrome oxide in the slag and thereby provide a slag from which metal oxides can be reduced, thereafter adding at least one of the group including carbon and silicon to the slag to reduce iron oxide and to prevent further iron oxidation; thereafter adding further silicon to the slag when the slag is at a chrome oxide reducing temperature with a lime-silica ratio of from 2.0 to 2.4, said silicon being in sufficient quantity to effect reduction of the chrome oxide in the slag, the chrome of the chrome oxide returning to the molten metal; and tapping the molten metal.

3. A method of making chrome alloy steel in a basic open hearth furnace of the regenerative type which consists in charging the furnace with materials containing silicon, chrome, iron, lime and carbon, one of said materials being chrome ore; heating the charge, thereby to provide molten metal with a slag thereon, the slag containing chrome oxide, iron oxide, silica, and substantially all of the lime in a lime-silica ratio of not less than 1, and to render the slag suitable for working; working said slag during the refining of the molten metal, including adding lime thereto, thus increasing the lime-silica ratio and hence the basicity of said slag in order to increase the reducible chrome oxide in the slag and thereby provide a slag from which iron and chrome oxides can be reduced and from which $P_2O_5$ will not be reduced (thereafter adding at least one of the group including carbon and silicon to the slag to reduce iron oxide and to prevent further iron oxidation; thereafter adding further silicon to the slag when the slag is at a chrome oxide reducing temperature with a lime-silica ratio of not less than 2.0, said silicon being in sufficient quantity to effect reduction of the chrome oxide in the slag, the chrome of the chrome oxide returning to the molten metal; and tapping the molten metal.

4. A method of making chrome alloy steel in a basic open hearth furnace of the regenerative type which consists in charging the furnace with materials containing silicon, chrome, iron, lime and carbon, one of said materials being chrome ore; heating the charge, thereby to provide molten metal with a slag thereon, the slag containing chrome oxide, iron oxide, silica, and substantially all of the lime in a lime-silica ratio of not less than 1, and to render the slag suitable for working; working said slag during the refining of the molten metal, including adding lime thereto, thus increasing the lime-silica ratio and hence the basicity of said slag in order to increase the reducible chrome oxide in the slag and thereby provide a slag from which metal oxides can be reduced, thereafter adding at least one of the group including carbon and silicon to the slag to reduce iron oxide and to prevent further iron oxidation; thereafter adding further lime, carbon and silicon to the slag when the slag is at a chrome oxide reducing temperature, said further lime addition being sufficient to increase said lime-silica ratio to not less than 2.0, said carbon and silicon being in sufficient quantity to effect reduction of the chrome oxide in the slag, the chrome of the chrome oxide returning to the molten metal; and tapping the molten metal.

5. A method of making chrome alloy steel in a basic open hearth furnace of the regenerative type which consists in charging the furnace with materials containing silicon, chrome, iron, lime and carbon, one of said materials being chrome ore; heating the charge, thereby to provide molten metal with a slag thereon, the slag containing chrome oxide, iron oxide, silicon, and substantially all of the lime in a lime-silica ratio of not less than 1, and to render the slag suitable for working; working said slag during the refining of the molten metal, including the consecutive steps of adding iron ore to reduce the carbon to permit its escape as CO and $CO_2$, adding lime thereto, thus increasing the lime-silica ratio and hence the basicity of said slag in order to change it from a glaucochroite slag to an ice-fern di-calcium silicate slag, thereby increasing the reducible chrome oxide in the slag and providing a slag from which metal oxides can be reduced, and adding at least one of the groups including carbon and silicon to the slag to reduce iron oxide and to prevent further iron oxidation; thereafter adding further silicon to the slag when the slag is at a chrome oxide reducing temperature with a lime-silica ratio of not less than 2.0, said silicon being in sufficient quantity to effect reduction of the chrome oxide in the slag, the chrome of the chrome oxide returning to the molten metal; and tapping the molten metal.

CHARLES R. FUNK.

REFERENCES CITED

The following references are of record in the file of this patent:

UNITED STATES PATENTS

| Number | Name | Date |
|---|---|---|
| 1,410,749 | Hadfield | Mar. 28, 1922 |
| 1,601,541 | Saklatwalla | Sept. 28, 1926 |
| 1,925,940 | Simpson | Sept. 5, 1933 |
| 2,176,689 | Udy | Oct. 17, 1939 |
| 2,218,391 | Bradford et al. | Oct. 15, 1940 |

FOREIGN PATENTS

| Number | Country | Date |
|---|---|---|
| 17,779 | Great Britain | 1901 |